United States Patent [19]
Edlich

[11] 3,810,401
[45] May 14, 1974

[54] TRANSMISSION

[76] Inventor: William Edlich, Union Hill, R.F.D. 1, Dover, N.J. 07801

[22] Filed: Sept. 5, 1972

[21] Appl. No.: 286,034

[52] U.S. Cl.................................. 74/691, 74/200
[51] Int. Cl...................... F16h 37/06, F16h 15/08
[58] Field of Search............. 74/690, 691, 199, 200

[56]         References Cited
         UNITED STATES PATENTS
3,302,474   2/1967   Edlich.............................. 74/200
2,086,491   7/1937   Dodge.............................. 74/691
2,466,964   4/1949   Perruca............................ 74/200

FOREIGN PATENTS OR APPLICATIONS
405,810   11/1924   Germany........................... 74/690

Primary Examiner—Arthur T. McKeon
Attorney, Agent, or Firm—Philip H. Pohl

[57] ABSTRACT

An improved split torque gear reducer transmission is disclosed which incorporates an improved novel ratio range selector transmission control and a disengaging mechanism for eliminating creep while the transmission is in the neutral mode. The ratio range selector comprises a lockable control lever moving a pivotable gear segment and gear rack to position the transmission elements in the desired mode.

8 Claims, 3 Drawing Figures

TRANSMISSION

BACKGROUND OF THE INVENTION

This invention relates to variable speed reversible power transmissions of the type commonly called variable split torque gear reducer. This type of transmission is used to mechanically control and transmit power in terms of torque, speed and direction to various rotating machinery, machine tools and vehicles. More particularly, this invention is directed to an improvement of the transmissions shown in my previous patents, specifically those shown in U.S. Pat. No. 2,353,448 issued July 11, 1944, and U.S. Pat. No. 3,302,474 issued Feb. 7, 1969, The type of power transmission illustrated by the aforementioned patents, and by this particular improvement thereon concerns those transmissions which embody a pair of rotatable races having functioning surfaces convexly contoured according to the tractrix or anti-friction curve, and which mate with a pair of traction wheels having laminated textile cooperating surfaces. The traction wheels are journaled on spindles or yokes are angularly related to one plane and tiltable in another plane, so that the relative shifting of the points of contact between the races and the traction wheels will vary the relative output of the transmission. My improvement on the previously disclosed variable ratio transmissions is to provide an improved assembly of operating elements, as well as other objects describable as follows.

SUMMARY OF THE INVENTION

Accordingly, it is an object of my invention to provide an apparatus which has a novel and simplified assembly;

Another object of this invention is to provide an apparatus which is self-energising, i.e. load responsive;

Still another object of this invention is to provide an apparatus for power transmission which allows for wear compensation automatically, and instant torque response to match power requirements;

Still another object of this invention is to provide a variable speed power transmission which in neutral eliminates creep, provides instant control and shifting, and locks the transmission into the selected speed.

I have therefore invented an improvement in a variable speed power transmission having a housing, an input shaft rotatingly mounted in the housing and extending therethrough, a first race mounted on the input shaft, another second race rotatingly mounted in the housing coaxially with the first race and at a spaced distance therefrom, and a differential gear unit. The differential gear unit has one of its input gears connected to the first race, and the other to the input shaft. The differential gear output is connected to the transmission output shaft. A pair of traction wheels are rotatingly positioned opposite each other and at right angles and between the races, each traction wheel being mounted on a pivotable shaft and yoke assembly, with each assembly being supported and pivotably mounted on a pair of cylindrical bearings attached to a slide moving on transverse guides. The improvement comprises a gear rack attached to one of the slides with its teeth parallel to the guides, gear control means such as a gear segment, meshing with the gear rack teeth, and control means such as a lever for moving the gear control means, thereby pivotally positioning the assembly and the traction wheels. Preferably the gear control means is a gear segment angularly mounted on a control shaft which is pivotably mounted through the housing and connected on the outside to a lockable control lever.

Other objects and advantages of the variable speed transmission according to the present invention will become apparent from the description of the drawings and the preferred embodiment which follow.

BRIEF DESCRIPTION OF THE PREFERRED EMBODIMENT

Briefly my invention is a novel and improved means for controlling the output of a variable speed power transmission of the type described in my U.S. Pat. No. 3,302,474. My present invention comprises a rack and pinion or gear segment control for positioning the relationship of the two traction wheels relative to an input and output race so as to obtain a positive ratio range selection, while at the same time providing a novel means for preventing creep when the transmission ratio range selection is in the neutral position. Such an advantageous operation is achieved by providing for the separation of the contacting surfaces of the transmission elements when in the neutral position, together with a positive self-energizing mechanism for applying a contacting force between the traction wheels and the races when the transmission is not in the neutral mode.

Figure 1:
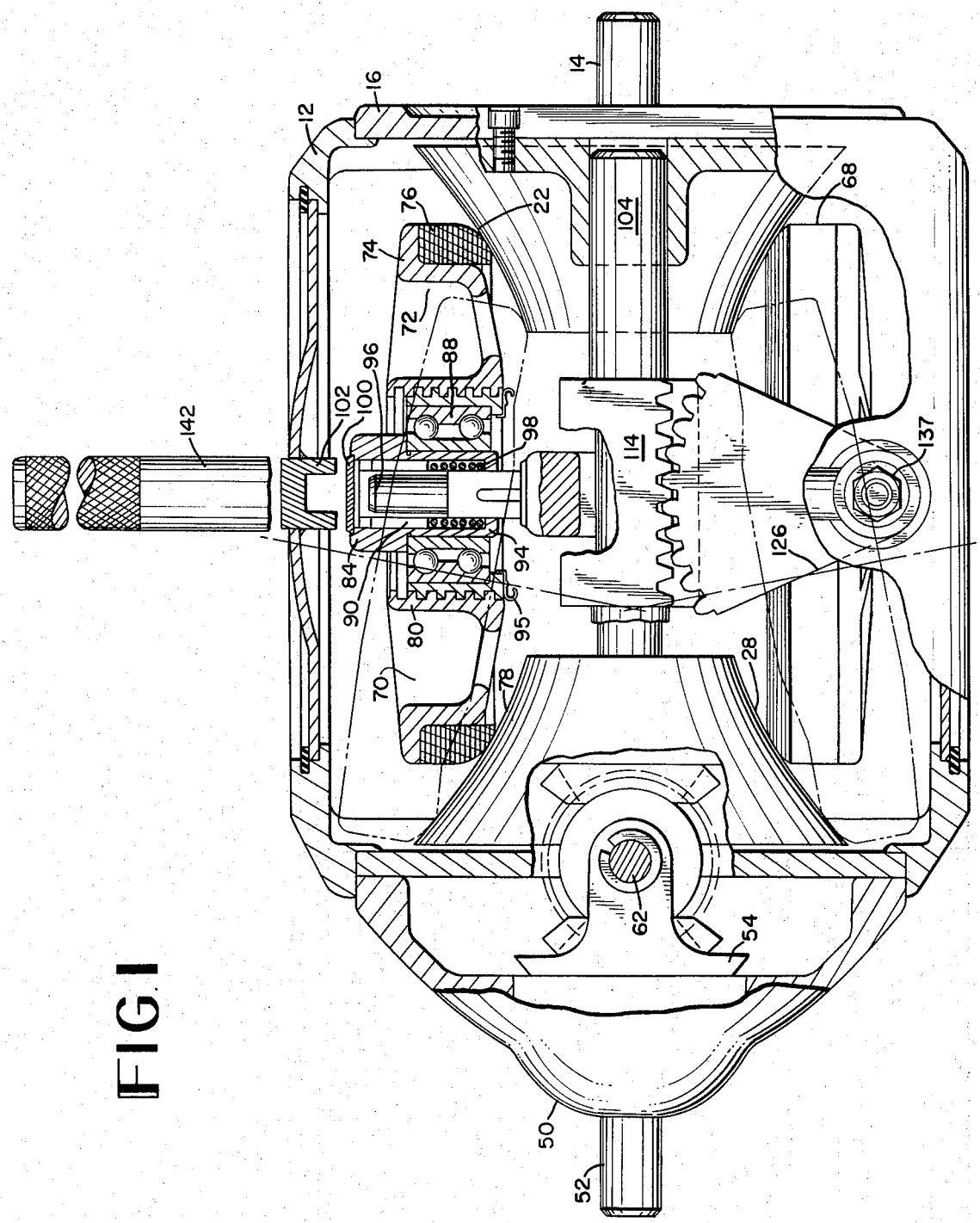
FIG. 1 of the drawings is a cross-sectional plan view of transmission according to the present invention.
Figure 2:
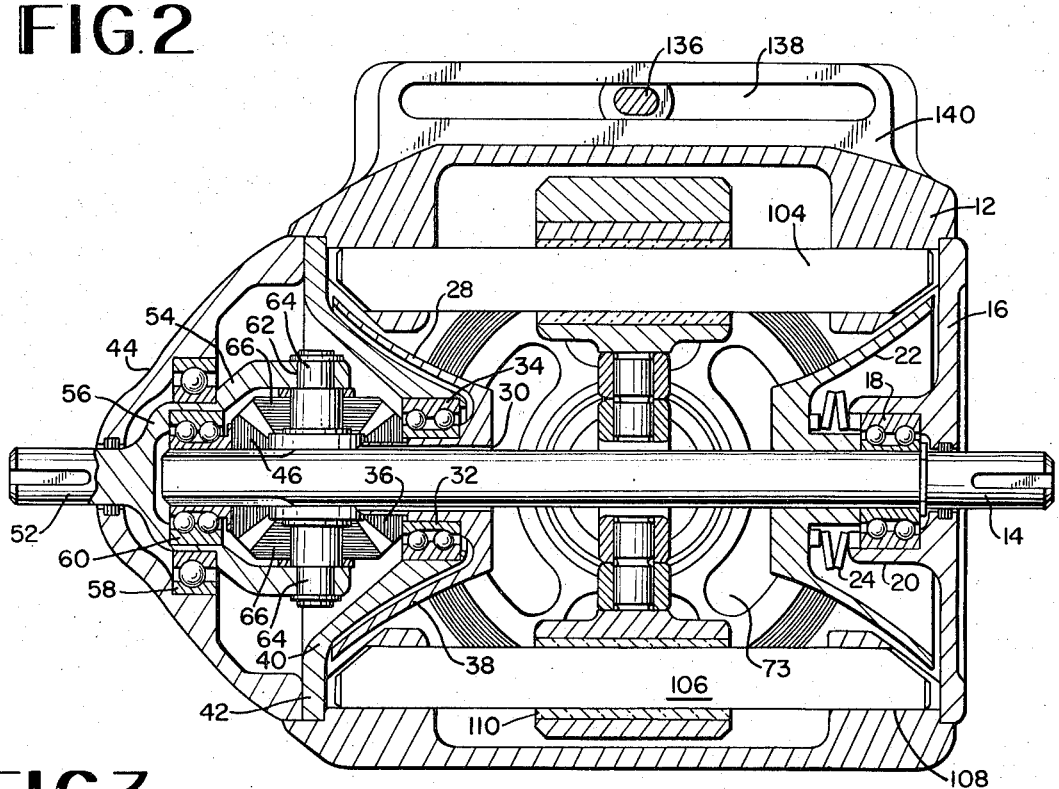
FIG. 2 is a cross-sectional view of the transmission taken at right angles to the plan view of FIG. 1.

Referring now to FIGS. 1 and 2 of the drawings, where a transmission housing 12 is shown in cross-sectional elevation and plan views. On the right side of the housing a power input shaft 14 extends from a power source, not shown, outside the housing through an end plate 16 into the housing. The input shaft 14 is centrally positioned inside the housing and is rotatingly supported at its input end by a set of roller bearings 18 which are inserted inside a plate socket 20 centrally located on the inside of the end plate 16. The other end of the input shaft inside the housing is rotatingly supported in a manner as will be hereinafter described. The end plate 16 and its socket is designed to provide sufficient structure to support the input shaft, yet provide clearance for an input race 22 made of steel and ground finished which is fixedly mounted on the input shaft, and extends back to adjacent the end plate. Axial clearance and proper positioning between the plate socket and the race 22 is furnished by one pair of Belleville springs 24. The input race 22 is itself a frustoconical structure which acts as the power input element of the transmission. In the preferred form, the race is formed with an outside power profile in the shape of a concave curve, having a transmission surface 26 with a cross-sectional profile in the form of the concave curve increasing in diameter towards the end plate and preferably conforming to the tractrix or anti-friction curve.

A second output steel race 28 is rotatingly mounted in a suitable manner at a fixed axial distance from the input race and coaxially about the input shaft 14; adequate clearence being provided between the input shaft and output race 28 by a clearance hole 30. The hole 30 is formed by an internal projection 32 in the output race 28, and provides an outside surface also on which an output race bearing 34 is mounted. Adjacent the output race bearing 34 is a bevel gear 36 with its beveled teeth facing away from the bearing 34. The output race 28 is also a frusto-conical structure having an outside surface or profile substantially similar to the surface shape of the input race 22, but with its surface diverging away from the other. The output race bearing 34 is supported externally by a cone shaped casting having a flange 42 circumferentially embedded in the housing. The cone end of the housing support projects into the volume enclosed by the output race 28, the conical housing support portion extending from its flange 42 being designated by the reference number 40.

Functionally the output race and the bevel gear 36, unitarily rotate on the same output race bearing 34. The bevel gear 36 forms one element of a differential gear unit 44 comprising a second bevel gear 46 fixedly mounted on the input shaft 14 at a point near the shaft end.

The differential unit 44 is enclosed within the housing between the support 40, and a bell shaped cap 50 which has a central hole through which the transmission output shaft 52 projects. The output shaft 52 is the stem of a cup shaped differential housing 54 and comprises an indented cup 56 adjacent the stem. The differential cup is supported on its outside by a ball bearing 58, the latter being internally supported by the bell shaped cap 50. Another bearing 60 is mounted internally in the cup shaped housing 54, between the housing 54 internally and the end of the input shaft 14. This arrangement allows the cup shaped housing 54 and the input shaft to rotate independently of each other. The differential housing 54 has a pair of holes or journals 62 oppositely located to each other and having a rotatable axls 64 mounted axle each hole. On each axle 64 there is mounted a differential bevel gear 66, each gear being in tooth to tooth contact with the output race bevel gear 36 and the second bevel gear 46, thereby forming in combination the differential gear unit.

Power transmission between the output race 28 and the input race 22 is achieved by the two traction wheels, respectively wheels 68 and 70 which are positioned at right angles to the races generally and adapted to contact the concave surface of the two races. Each of the traction wheels has a circumferential rim 72 on which a laminated textile lining is bonded. The lining has a convex surface which functions as the frictional contact of the wheel to race contact. Each traction wheel has an internally threaded ring 80 in the form of an Acme female thread.

The Acme threading is selected with a pitch which enables the traction wheel to move inwardly towards the input shaft when a torque, load or retarding-resistive force is applied to the wheel. The traction wheels 68 and 70 are each mounted on a different spring loaded bearing assembly 84 which is externally threaded on its radial surface with a male Acme thread mating with the mounting ring 80. Interior of the male Acme threaded portion of the assembly 84 is a ball bearing 88 which has its inner race mounted on an axle sleeve 94 which encloses a threaded bushing 90. The threaded bushing 90 provides the run out thread needed for adjustment when the textile liner on the traction wheel wears. The bearing assembly 84 also has a set of clips 95 located on the end of the male Acme threading which act as retainers. Inside the sleeve 94 and between the bottom of the threaded bushing 90 and an inwardly flanged end of the sleeve is a pilot spring 98. As the bushing 90 is threadedly mounted on the axle 96, the pilot spring provides a biasing force on the flanged end of the sleeve 94 pushing it towards the input shaft and thus moving the traction wheel in the same direction. Also part of the assembly 84 is a keeper 100 which is fixedly attached to the top end of the sleeve 94 and is made of a magnetically attractive material. Functionally it is seen that the pilot spring operates to move the sleeve bearing assembly on the axle 96 towards the input shaft and therefor to provide a contacting force between the traction wheel linings and the surfaces of the respective races. The initial contact force provided by the pilot spring is designed to be sufficient to enable the frictional contact of the wheel to race to transfer enough torque to cam the traction wheel on the Acme threading into adequate contact with the races to transfer the operating forces.

A pair of strong magnets 102 are internally attached in the housing opposite the points that the two keepers 100 are when the transmission is in neutral, where the magnet 102 acts to compress pilot spring 98, lifting the bearing assembly 84 and the attached traction wheel away from wheel to race contact. This feature acts to eliminate any tendency for the transmission to creep while in neutral regardless of the fact that for most production machinery it is impossible to achieve a theoretical value for neutral. It is also to be noted that while a permanent magnet 102 is described herein, use of an electromagnet in place thereof is also suitable and contemplated by this invention.

Figure 3:
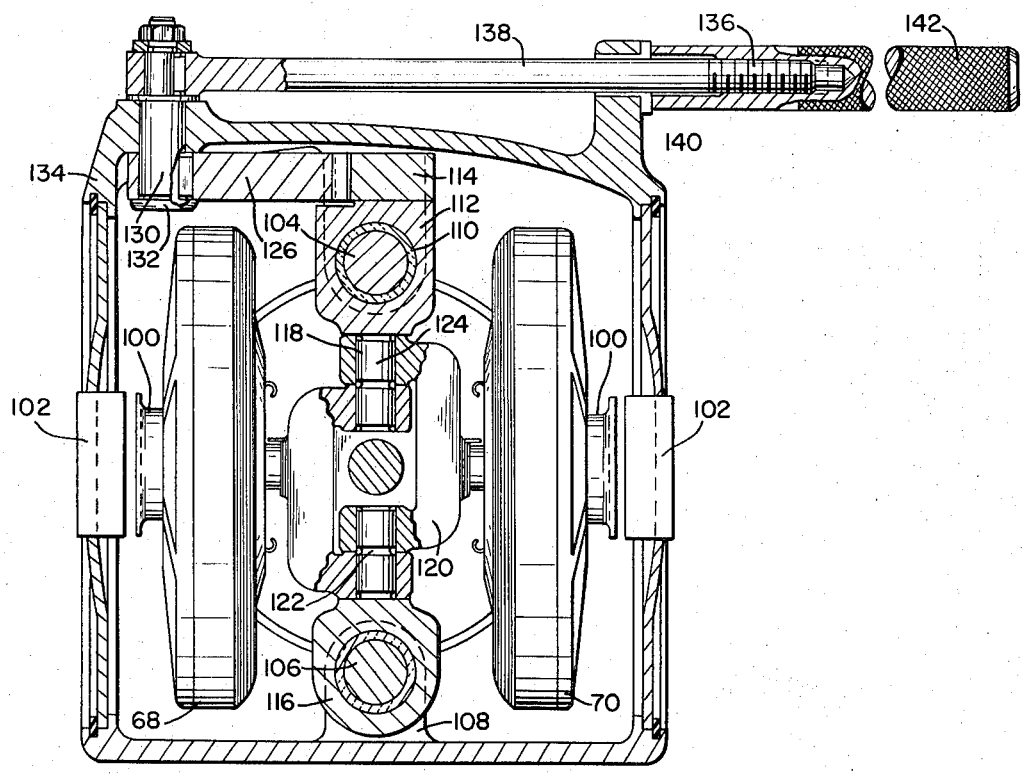
FIG. 3 is a cross-sectional view of the transmission taken along section 3—3 of FIG. 2.

Referring now to FIG. 3 of the drawing, a pair of transverse guides 104 and 106 respectively are shown rigidly mounted parallel to the input shaft at opposite ends of the housing by brackets 108 projecting inwardly from the housing wall. An oiless sleeve 110 is slidingly mounted on each of the guides 104, 106, and acts as the journal for a respective slide 112 and 116. One of the slides 112 has attached at its edge a gear rack 114, (the other slide 116 does not have this feature, but otherwise is similar to the first slide). Both of the slides 112 and 116 have an arm extending inwardly in the form of a cylindrical bearing 118, which connects to the spring loaded bearing assembly 84. Returning now to the assembly 84, each assembly has a U shaped yoke 120 which projects inwardly from the axle 96, but with unequal arms for the yoke's U portion. Such an offset for the yoke arms prevents interference between the arms when they are assembled. A pair of shaft holes 122 and 124 are located respectively on each of the yoke arms with the pair of holes being in the same axis. Through each of the holes 122 and 124 is inserted the respective cylindrical bearing 118 with the load arm of one yoke being adjacent a respective slide and the other shorter arm being inside the long arm of the other yoke. Each of the yokes are pivotably mounted on the cylindrical bearings of the slide. Movement of the slides, specifically slide 112 on which the rack 114 is located pivots both yokes and moves the respective traction wheels relative to the input and output races. Movement of the gear rack 114 is achieved by use of a mating gear segment 126, which is mounted on a pivot shaft 130 within the housing. The gear segment 126 is keyed to the pivot shaft 130 and held on the shaft in a conventional manner by head 132.

The pivot shaft 130 entends through the housing wall via a suitable mounting hole and journal 134 for a distance beyond the housing. There a control lever 136 is fixedly mounted at its lower end on the pivot shaft and held on the shaft by a nut 137 threadedly secured thereto. The control lever 136 projects upwardly through a slot 138 form in a flat extension 140 on the outside of the housing. The upper end of the control lever is threadedly inserted in a handle 142 which on being turned moves axially on the lever, allowing the lever to be locked in any desired position by tightening the handle against the slotted extension. It is therefore seen that the transmission described according to the present invention provides positive control of the positioning of the traction wheels relative the races, enabling quick positive selection of the desired ratio range, and also provides a novel design for eliminating creep when the transmission is set in neutral.

In operation the input power is transmitted to the input race and through the traction wheels to the output race. The relative positioning of the traction wheels operating in conjunction with the races transmit a differential rotation between the bevel gear attached to the output race and the second bevel gear attached to the input shaft. This differential rotation is transmitted to the output shaft by the differential gearing to provide a smooth flow and control of output speed, torque, and direction by the transmission. Having thus fully described my invention and wishing to cover those modifications variations which would be apparent to those skilled in the art without departing from either the spirit or scope thereof,

I claim:

1. In a variable speed reversible power transmission having a housing, an input shaft rotatingly mounted in said housing and extending therethrough, a first race mounted fixedly on said input shaft inside said housing, a second race rotatingly mounted in said housing coaxially with said first race and at a spaced distance therefrom, a differential gear assembly mounted in said housing having an input gear fixedly connected to said second race, a second gear attached to the input shaft, and a differential output, an output shaft rotatingly mounted in said housing and extending therethrough, said output shaft being connected to said differential output, a first traction wheel rotatingly mounted on a bearing assembly in said housing and contacting at its outer edge said first and second races, a second traction wheel rotatingly mounted on a second bearing assembly in said housing opposite and at a spaced distance from said first wheel, said second wheel contacting at its circumferential edge said first and second races, the improvement comprising a first yoke connected to said first bearing assembly, a second yoke connected to said second bearing assembly, said first and second bearing assemblies being pivotally mounted on pivots about an axis perpendicular to said input shaft, said pivots being slidingly mounted in said housing in a plane along said input shaft, a gear rack fixedly connected to said pivots, said rack being parallel to said input shaft axis, gear control means for controllingly moving said gear rack, manual control means for moving said gear control means, whereby said first and second traction wheels are positively positioned relative to said races, contact means for applying a contacting force between said traction wheels and said races, when a differential torque is applied to said traction wheels, and contact removing means for removing said first and second traction wheels from contact with said races in neutral position whereby said transmission is prevented from creeping.

2. The transmission according to claim 1 wherein said manual control means comprises a control shaft rotatingly mounted in said housing, said gear segment being fixedly mounted on said control shaft, said control shaft extending through said housing, and a lever fixedly connected to said control shaft outside said housing.

3. The transmission according to claim 1 wherein said contact means for applying a contacting force between said traction wheels and said races comprises biasing means mounted on each of said bearing assemblies for urging each of said respective traction wheels toward said races, said traction wheels being slidingly mounted on said bearing assemblies, and having an internally threaded hole, a male threaded collar mounted on said biasing means in in thread to thread contact with said hole, the pitch of said threads being adapted to move said traction wheels toward said races when a differential torque is applied to said wheels.

4. The transmission according to claim 3 wherein said means for removing said first and second traction wheels from contact with said races comprises a first and second magnet, each magnet being mounted in said housing at locations respectively opposite the position of each respective bearing assembly, when each of said respective traction wheels is in the transmission neutral position, said magnets having sufficient attractive force in said neutral position to overcome said biasing means.

5. The transmission according to claim 3 wherein said races are frusto-conical in shape, each race having a peripheral profile conforming to a tractrix curve, and wherein said traction wheels have a textile lining contacting said races.

6. The transmission according to claim 3 wherein the threads of said collar and said wheel holes is an Acme thread.

7. The transmission of claim 6 wherein said magnets are permanent magnets.

8. In a variable speed reversible power transmission having a housing, an input shaft rotatingly mounted in said housing and extending therethrough, a first race mounted fixedly on said input shaft inside said housing, a second race rotatingly mounted in said housing coaxially with said first race and at a spaced distance therefrom, a differential gear assembly mounted in said housing having an input gear fixedly connected to said second race, a second gear attached to the input shaft, and a pair of differential output gears, an output shaft rotatingly mounted in said housing and extending therethrough, said output shaft being connected to said differential output, a first traction wheel rotatingly mounted on a bearing assembly in said housing and contacting at its outer edge said first and second races, a second traction wheel rotatingly mounted on a second bearing assembly in said housing opposite and at a spaced distance from said first wheel, said second wheel contacting at its circumferential edge said first and second races, and means for controlingly moving said bearing assemblies and the traction wheels mounted thereon relative to the races, the improvement comprising contact means for applying a contacting force between said traction wheels and said races when a differential torque is applied to said traction wheels, and contact removing means for removing said first and second traction wheels from contact with said races when said differential torque is nominal, said transmission being in neutral position whereby creep while in the neutral position is eliminated.

* * * * *